United States Patent [19]

Huppunen et al.

[11] 4,256,252

[45] Mar. 17, 1981

[54] SOLDERING APPARATUS

[75] Inventors: Robert D. Huppunen, Cos Cob; Robert R. Harriau, Old Greenwich, both of Conn.

[73] Assignee: Thermatool Corp., Stamford, Conn.

[21] Appl. No.: 14,858

[22] Filed: Feb. 26, 1979

[51] Int. Cl.³ .......................... B23K 1/08; B23K 1/06
[52] U.S. Cl. .................................. 228/1 A; 228/34; 228/36
[58] Field of Search ................. 228/183, 1 A, 36, 40, 228/34, 47, 110, 262, 242, 231, 232, 56

[56] References Cited

U.S. PATENT DOCUMENTS

| | | | |
|---|---|---|---|
| 1,481,887 | 1/1924 | Berg et al. | 228/232 |
| 1,841,194 | 1/1932 | Lormor | 228/242 |
| 3,226,821 | 1/1966 | Van Dijk et al. | 228/36 |
| 3,499,220 | 3/1970 | Hintz | 228/36 |
| 3,680,762 | 8/1972 | Kondo | 228/232 |
| 3,920,176 | 11/1975 | Becker et al. | 228/183 |
| 3,980,219 | 9/1976 | Schmid | 228/34 |

FOREIGN PATENT DOCUMENTS 560944  4/1944  United Kingdom ...................... 228/34

*Primary Examiner*—Daniel C. Crane

*Attorney, Agent, or Firm*—Brooks, Haidt, Haffner & Delahunty

[57] ABSTRACT

A method and apparatus for soldering tubular, metal return bends to the ends of tubes in which the article carrying the tubes with the bends secured thereto is first pivoted around a horizontal axis from a horizontal loading and unloading first position to a second position in which the bends and tube ends are immersed in molten solder in a pot and is then pivoted around such axis into a third position in which the bends are above the ends of the tubes, the solder between the ends of the tubes and the bends being permitted to cool and solidify in the third position. Intermediate the first and second positions and intermediate the second and third positions, pivotally mounted burners heat at least the bends to a temperature at least as high as the melting temperature of the solder, the heating between the second and third positions being for the purposes of causing any solder in the bends to flow out of the bends and of minimizing or eliminating icicles of solder on the bends. The apparatus includes a pivotable support for the article, skimming apparatus for stirring, and displacing dross on, the solder in the pot, ultrasonic solder agitating apparatus, burner oscillating apparatus and controls for automatically operating the parts in the desired sequence.

9 Claims, 8 Drawing Figures

SOLDERING APPARATUS

This invention relates to a method of soldering and apparatus for performing such method and particularly, to a method and apparatus for soldering tubular elements, such as a metal heat exchanger elements.

Methods of manufacturing metal heat exchanger elements comprising metal fins secured to interconnected tubes are well known in the art, and some such methods comprise securing such fins to hairpin shaped tubes and then, interconnecting ends of adjacent tubes by soldering a short length of U-shaped tube, known as a return bend, to such ends by dipping the tube ends with the U-shaped tubes mechanically held thereon into a molten bath of solder which is agitated by ultrasonic energy. See, for example, U.S. Pat. No. 3,920,176.

In the process described in said patent, the article to be soldered is mounted on a conveyor or table and successively moved around an axis to several stations at which various steps are performed including pre-heating, dipping into molten solder in a pot and cooling. After the joints to be soldered are dipped into the molten solder, the article is inverted to cause the solder to flow into the spaces between the flared female ends of the tubes and the male ends of the U-shaped tubes. According to the patent, such inversion of the article prevents the formation of tears or icicles.

The apparatus of said patent is relatively large and requires a relatively large working space. In addition, it has been found that, in practice, molten solder can sometimes fill a U-shaped tube due to leakage of the solder into the U-shaped tube through the space between such tube and the tube end to which it is being soldered when the U-shaped tube is dipped into the molten solder. When the article is inverted, the solder does not always run out of the U-shaped tube, and when the solder solidifies, it blocks the tubing system and renders the article useless. Even if the U-shaped tube is not completely filled, there can be a substantial restriction of fluid flow through the tubing system if a substantial amount of solder remains in the U-shaped tube. Furthermore, it has been found that mere inversion of the article after the U-shaped tubes are removed from the molten solder to eliminate tears or icicles does not always eliminate them.

One object of the invention is to provide apparatus for soldering tubes to other tubes which is relatively small in size and which will produce soldered articles at least as rapidly as prior art apparatus.

Another object of the invention is to provide a method for reducing solder obstructions in the soldered tubes which also reduces the formation and/or size of tears or icicles and to provide apparatus for performing such method.

Another object of the invention is to provide apparatus for removing dross from the top of molten solder, which apparatus can be included in the soldering apparatus of the invention to improve the performance thereof.

In the preferred embodiment of the method of the invention, the U-shaped tubes to be soldered to other tubes are frictionally engaged with the interior walls of the other tubes, and the article carrying the tubes is pivoted step-wise about an axis disposed so that the U-shaped tubes pass firstly, into the flames of gas burners to preheat the tubes, secondly, into a bath of molten solder which, preferably, is agitated by ultrasonic energy, thirdly, into the flames of the gas burners to prevent solidification of the solder and fourthly, while the solder is still molten, into a position such that the U-shaped tubes have their open ends facing in the downward direction. During the time that the article is rotated, and prior to immersion of the tubes into the molten solder, dross is removed from the top of the solder where the tubes are to be immersed.

The preferred embodiment of the apparatus of the invention includes:

(1) a pivotally mounted platen for receiving and holding an article to be soldered, the platen having an article receiving surface which, in the loading position of the platen, extends horizontally and parallel to the pivot axis of the platen;

(2) a pivotally mounted gas burner carriage disposed so that when it is in its vertical position and the platen surface is horizontal, the flames from the burners will impinge on the tubes to receive, or which have received, solder. The carriage is pivotable out of the path of movement of the platen;

(3) means for oscillating the burner carriage while the burner flames impinge on the tubes;

(4) a solder pot with ultrasonic transducers for agitating molten solder in the pot; and (5) skimming apparatus for displacing dross from the portion of the top of the molten solder where the tubes are to be immersed.

Although the operation of the various portions of the described apparatus may be controlled manually, it is preferred that the apparatus include control means for automatically moving the platen and the burner carriage to their various positions and initiating the operation of the oscillating means and the skimming apparatus after the article which has the tubes to be soldered together is mounted on the platen and the cycle of operation has been initiated manually.

Other objects and advantages of the present invention will be apparent from the following detailed description of the presently preferred embodiments thereof, which description should be considered in conjunction with the accompanying drawings in which:

Figure 1:
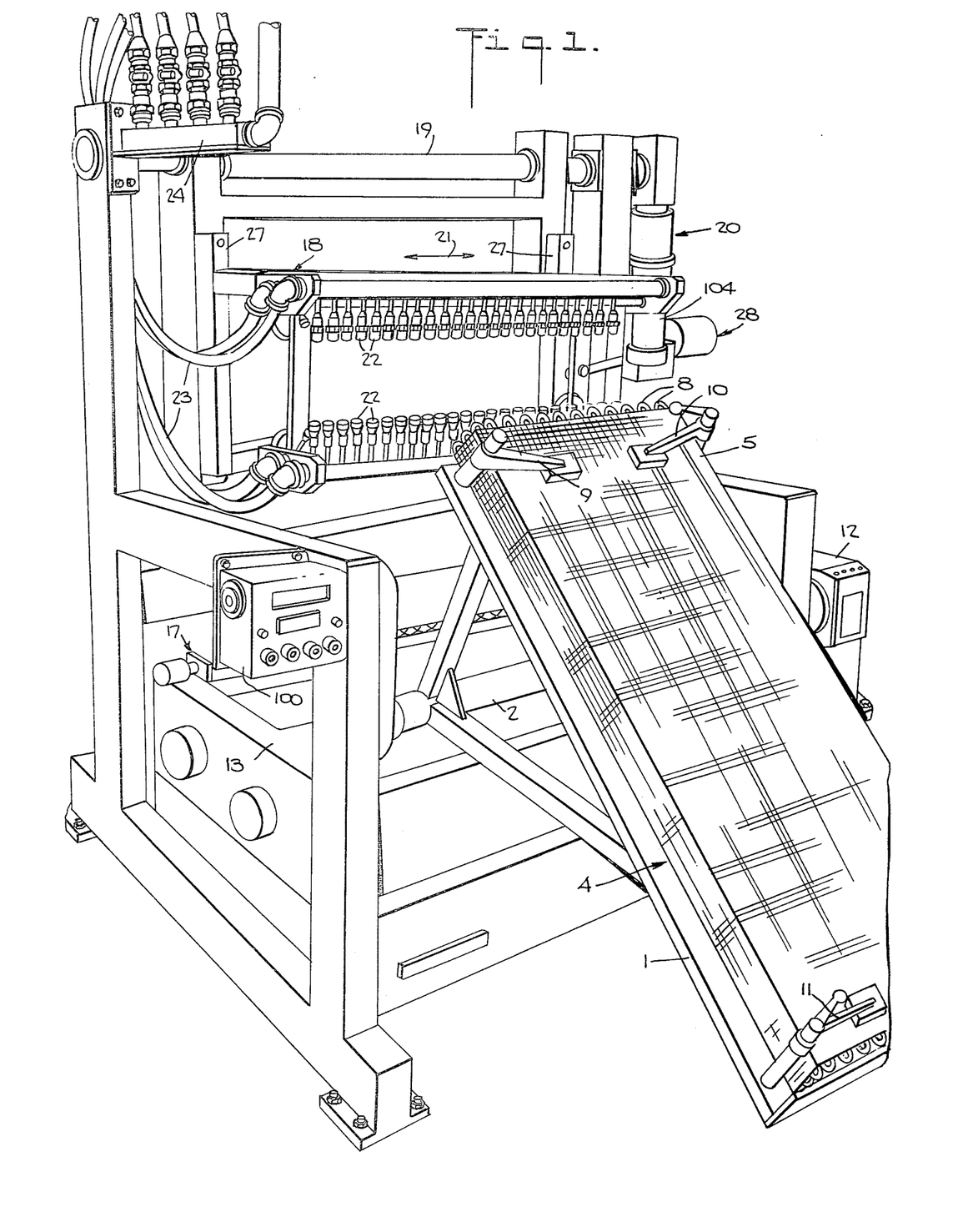
FIG. 1 is a perspective view of the preferred embodiment of the apparatus of the invention.
Figure 2:
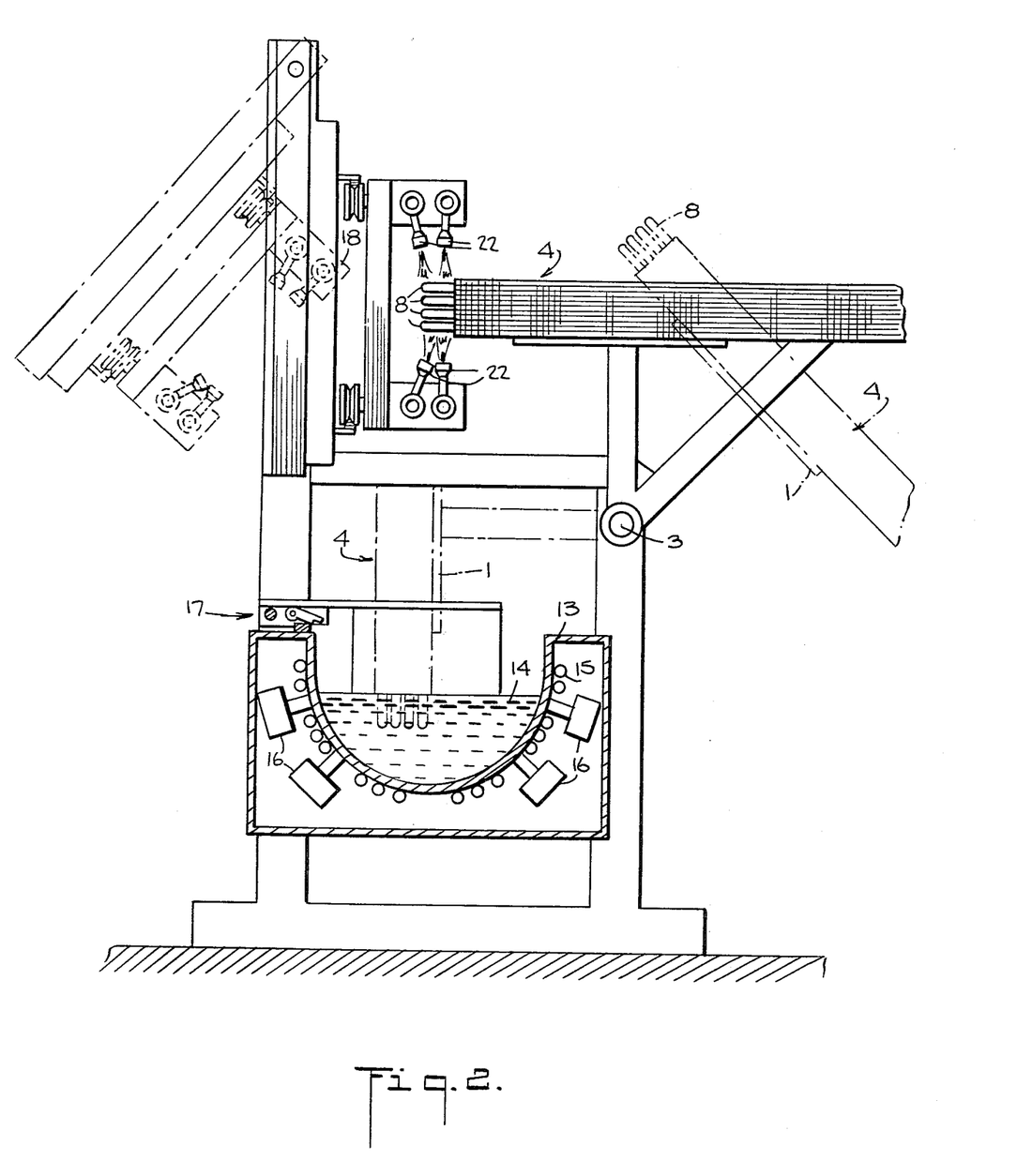
FIG. 2 is a schematic, side elevation view of the apparatus illustrated in FIG. 1.
Figures 5, 6:
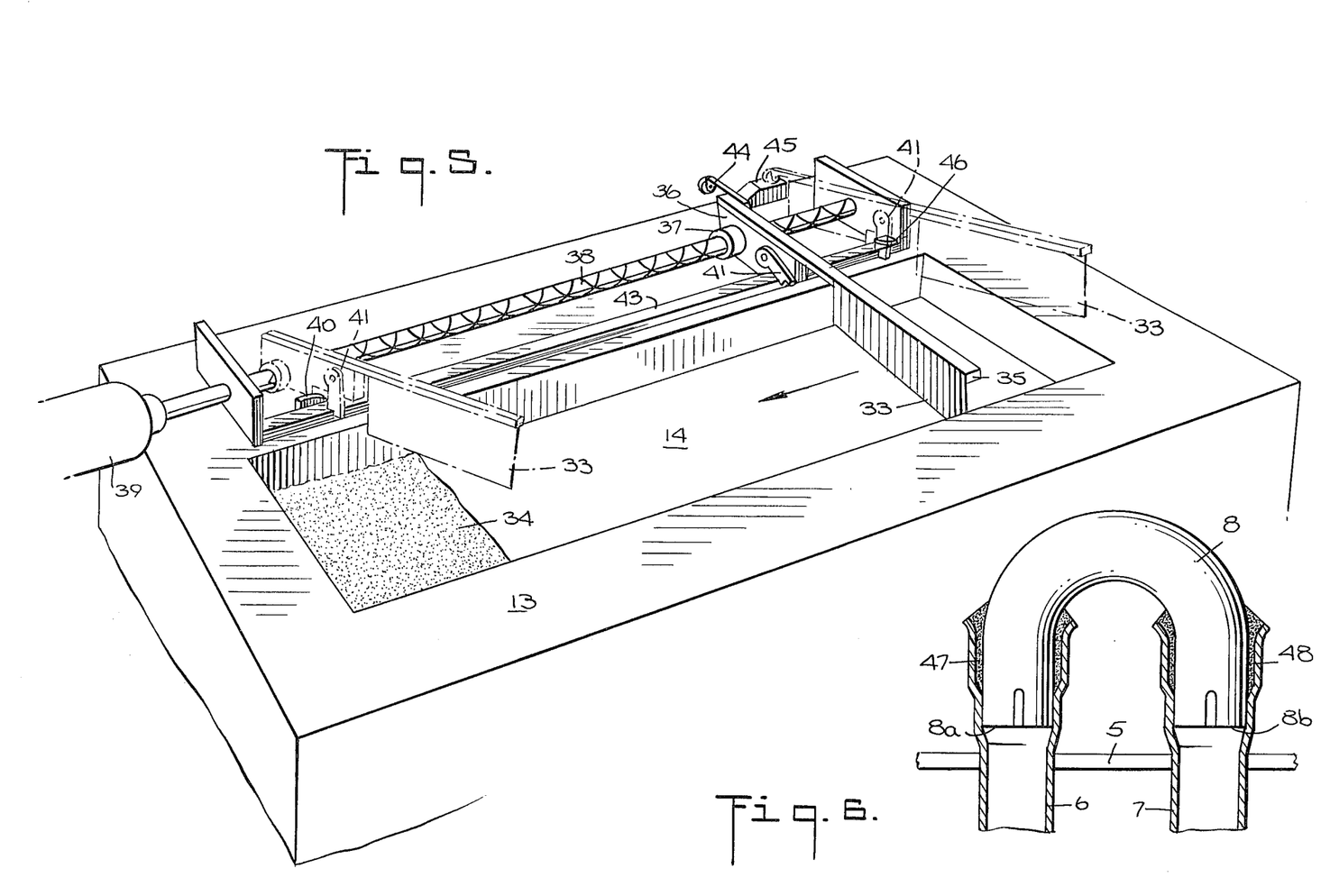
FIG. 5 is a perspective view of the solder pot and dross removing apparatus forming part of the apparatus shown in FIG. 1.
FIG. 6 is an enlarged, fragmentary view, partly in section, of a return bend interconnecting the ends of a pair of tubes.

The apparatus illustrated in FIGS. 1 and 2 comprises a support 1 in the form of a platen supported by a pivotable shaft 2 having a horizontal pivot axis 3. The upper surface of the platen 1 lies in a plane parallel to the axis 3 and supports a heat exchanger 4 having fins 5 secured to and extending around tubes 6, 7, etc. (see FIG. 6) and interconnected by U-shaped tubes, or return bends 8. The tubes 6, 7, etc. may be interconnected by the tubes 8 in various ways, e.g. so that all tubes 6, 7, etc. are connected in series for fluid flow. The exchanger 4 is held on the upper surface of the platen 1 by a plurality of clamps 9, 10 and 11 as well as a fourth similar clamp, not shown in FIG. 1, at the remaining corner of the exchanger 4. FIG. 6 shows a bend 8 which has been soldered to a pair of tubes 6 and 7, and each tube 6 and 7 usually has a hairpin shape with the ends thereof opposite to those shown in FIG. 6 similarly interconnected by bends 8 to other tubes. However, tubes 6 and 7 could be straight tubes with the ends of the tubes at each end of the exchanger 4 interconnected by bends 8.

The platen 1 is pivotable around the axis 3 by a motor and gear drive unit 12 and is movable from the position shown in solid lines (FIG. 2), in which the upper surface thereof is horizontal, to a second position to one side of the axis 3 in which the surface is vertical (shown in dash-dot lines in FIG. 2) and to a third position at the other side of the axis 3 which the surface is at an angle to the horizontal. The third position is shown in dash-dot lines in FIG. 2 and corresponds to the position of the platen 1 shown in FIG. 1.

A solder pot 13 is disposed so that the return bends 8 are immersed in molten solder 14 when the platen 1 is in its second position. The pot 13 is provided with heating coils 15 and ultrasonic transducers 16 of a known type. Dross is removed from the surface of the molten solder 14 and the solder 14 is stirred by skimming apparatus 17 described hereinafter in connection with FIG. 5.

A gas burner carriage 18 is supported by a pivotable shaft 19 which is pivotable by a motor and gear drive 20. Preferably, apparatus described hereinafter in connection with FIGS. 3 and 4, the carriage 18 is oscillated in the directions indicated by the double-ended arrow 21 shown in FIG. 1, e.g., at a rate of about one cycle per second. The carriage 18 carries four rows of burners 11 supplied with gaseous fuel by way of hoses 23 connected to a manifold 24. The carriage 18 is movable from the vertical position shown in solid lines in FIGS. 1 and 2 to the tilted position shown in dash-dot lines in FIG. 2, and in the position shown in solid lines the flames from the burners 22 will impinge on the return bends 8 when the platen 1 is in or near the position shown in solid lines in FIG. 2.

Figure 3:
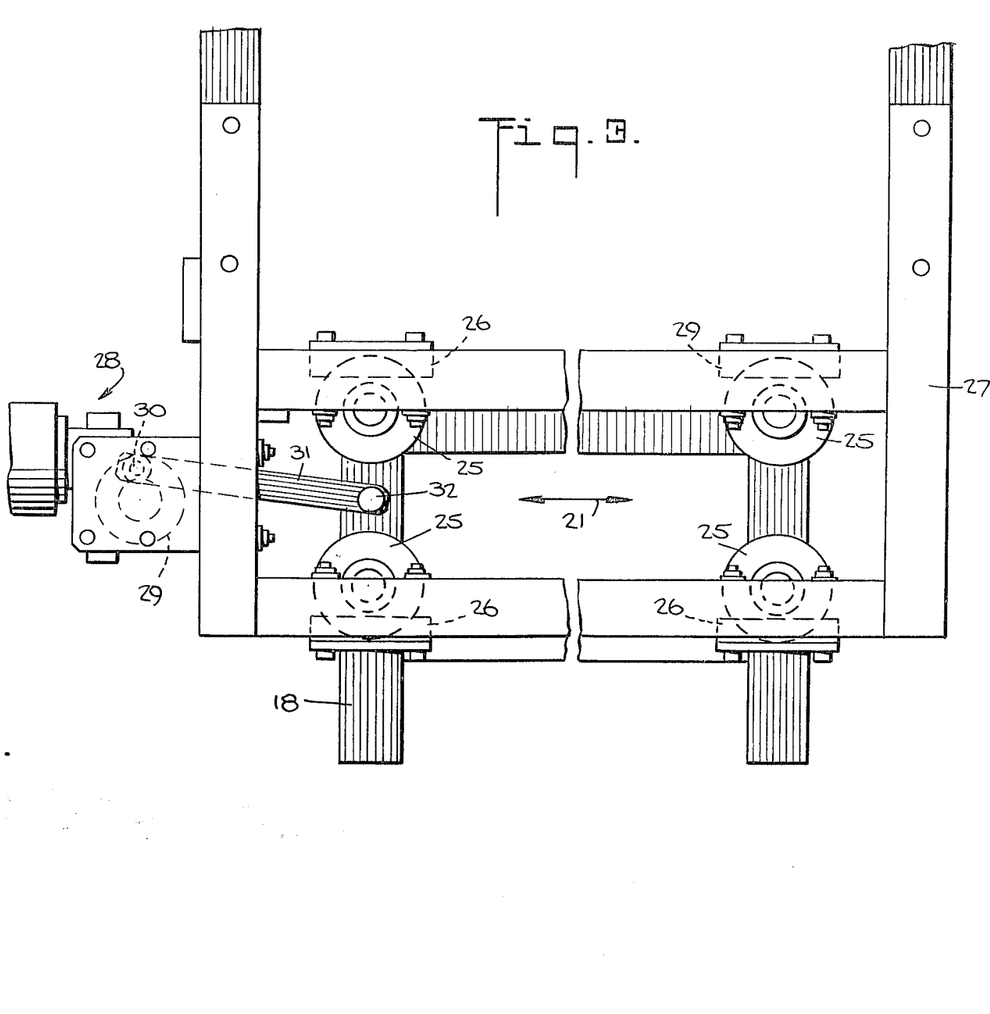
FIGS. 3 and 4 are, respectively, enlarged side and end elevation views of the burner oscillating portion of the apparatus shown in FIG. 1.
Figure 4:
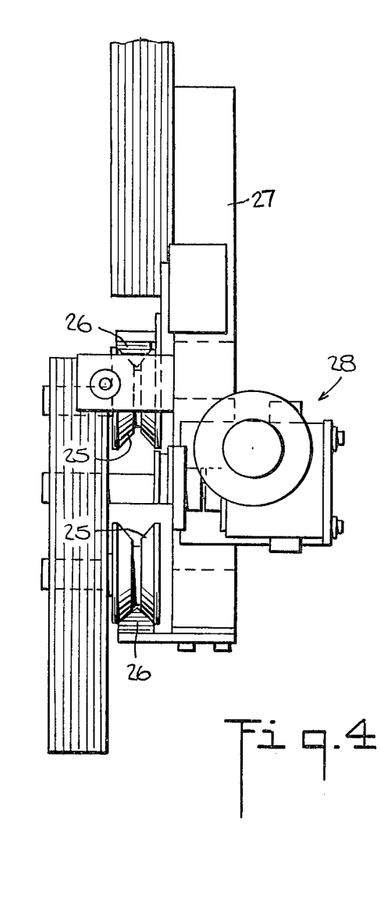

As shown in FIGS. 3 and 4, the carriage 18 is supported by two pairs of rotatable wheels 25 which ride on tracks 26 carried by a frame 27 which is secured to the pivotable shaft 19. A motor and gear drive unit 28, also mounted on the frame 27 rotates a disc 29 having a pin 30 near its periphery. A link 31 extends from the pin 30 to a similar pin 32 on the carriage 18 so that as the disc 29 rotates, the carriage 18 oscillates as indicated by the arrow 21. The purpose of such oscillation of the carriage 18 is to distribute evenly the heating of the bends 8 by the flames from the burners 22.

While not essential, the preferred embodiment of the soldering apparatus of the invention includes the skimming apparatus 17 illustrated in FIG. 5. Such apparatus 17 comprises a skimmer or paddle 33 which is illustrated by solid lines in its position when it is immersed in the solder 14. The skimmer 33 is illustrated by dash-dot lines at the right end of FIG. 5, and in this position, it is at rest or inactive. At the left end of FIG. 5, the dash-dot illustration of the skimmer 33 shows its position when it is removed from the solder 14 after moving dross 34 to the left end of the solder pot 13 and after stirring the solder 14.

The skimmer or paddle 33 extends from an arm 35 secured to a block 36 which has a threaded collar 37 secured thereto. A known type of self-reversing screw shaft 38 extends through the collar 37 and is rotatable by a motor and gear drive 39 which may, for example, rotate the shaft 38 at about 160 r.p.m. The shaft 38 always rotates in the same direction, and it moves the block 36, and hence, the skimmer 33, from the position shown in full lines to the position shown in dash-dot lines at the left end of FIG. 5. Just prior to reaching the latter position, the block 36 engages a fixed cam 40 which raises the skimmer 33 out of the solder 14, and such raising of the skimmer 33 permits a pivotable catch or detent 41 to lower and engage its lower end with a rail 43. The direction of movement of the block 36 is then reversed by the shaft 38, but the skimmer 33 remains in its raised position by reason of engagement of the catch 41 with the rail 43. The shaft 38 then moves the block 36 to the position shown in dash-dot lines at the right end of FIG. 5 where an arm 44 engages the operating element of a switch 45 which stops the drive 39.

The skimmer 33 then remains in a fixed, raised position until the drive 39 is again operated at which time rotation of the shaft 38 causes the block 36 to move farther to the right, as viewed in FIG. 5, which causes the catch 41 to engage a cam 46 which disengages the lower end of the catch 41 from the rail 43 and permits the skimmer 33 to lower and become immersed in the solder 14. The movement of the block 36 is then reversed by the shaft 38 so that it moves to the left, as viewed in FIG. 5, and so that the skimmer 33 pushes dross 34 on top of the molten solder 14 to the left end of the solder pot 13 and at the same time, stirs the solder 14 to eliminate composition variations due to density and thermal differences. During the latter movement, the side of the catch 41 rides on the rail 43. The catch 41 may pivot into its rail-engaging position merely by reason of gravity or may be spring biassed into the vertical position shown in dash-dot lines.

In summary, each time that operation of the drive 39 is initiated, the skimmer 33 lowers into the molten solder 14, moves to the left end of the pot 13, withdraws from the solder 14 and returns to a rest position at the right end of the pot 13 in its withdrawn or raised position.

Prefereably, prior to mounting the exchanger 4 in the platen 1, the return bends 8 are inserted into the flared ends of the tubes 6 and 7, a bend 8 inserted in a pair of tubes 6 and 7 being shown in FIG. 6, and the bends 8 are held in place by reason of the friction between the bends 8 and the tubes 6 and 7. When the bends 8 are immersed in the molten solder 14, the bends 8 are lower than the ends of the tubes 6 and 7, that is, their relative positions are reversed from those shown in FIG. 6, and the bends 8 and the ends of the tubes 6 and 7 are immersed so that the level of the solder 14 is above the ends 8a and 8b of the bends 8. In this position, molten solder 14 flows into the spaces and 47 and 48 between the bends 8 and the flared ends of the tubes 6 and 7, and if the fit between the end portions of the bends 8 and the tubes 6 and 7 is not adequate to prevent the flow of solder therebetween, solder will flow into the tubes 6 and 7 and then into the bends 8. Thereafter, when the platen 1 is moved around the axis 3, the solder will run along the inner walls of the tubes 6 and 7, if it is still molten, but if the solder cools rapidly, it will remain in the bends 8 and either wholly or partially block the bends 8. At the same time, the solder will remain in the spaces 47 and 48 and form a seal between the bends 8 and the tubes 6 and 7. To make certain that the solder flows out of the bends 8 and to reduce or eliminate icicles on the bends 8, flames from the burners 22 are directed on the tips of the bends 8 after they are removed from the molten solder 14 and while the platen 1 is in substantially the horizontal position shown in FIG. 2. Preferably, the platen 1, and hence, the exchanger 4, is moved into the approximately 45° position shown in FIG. 4, while the solder is still molten, to cause the solder to run out of the bends 8 more rapidly and/or to cause it to be relatively widely distributed on the inner walls of the tubes 6 and 7. Due to capillary action, the solder does not flow out of the spaces 47 and 48 during the time that the bends 8 are heated, and because the burner flames are concentrated on the bends 8, the solder between the bends 8 and the tubes 6 and 7 is at a temperature lower than the portions of the bends 8 exposed to the flames.

In the preferred method of operating the apparatus described hereinbefore, the steps are as follows:
(1) With the platen 1 in the horizontal position shown in FIG. 2 and with the bends 8 frictionally secured to the corresponding tubes 6 and 7, the exchanger 4 is mounted on the platen 1 and is secured thereto by the clamps 9, 10, 11, etc.
(2) The bends 8, and hence, the associated ends of the tubes 6 and 7, are preheated by means of flames from the burners 22 prior to being immersed in the solder 14 which has previously been rendered molten.
(3) The skimming apparatus 17 is operated to remove dross 34 from the area of the molten solder 14 where the bends 8 are to be immersed and to stir the solder 14.
(4) The burners 22 are moved out of the way of the platen 1, and the platen 1 is moved into its vertical position so that the bends 8 and the ends of the tubes 6 and 7 are immersed in the molten solder 14.
(5) After a short "soaking" time, the transducers 16 are activated for a short time.
(6) Shortly after the transducers 16 are deactivated, the platen 1 is moved from its vertical position to the 45° position shown in dash-dot lines in FIG. 2, and as it is so moved, the burners 22 are brought adjacent the bends 8 so that the flames of the burners impinge on the tips of the bends 8 to maintain in the molten state any solder on the outside or inside of the bends 8.
(7) The platen 1 is maintained in said 45° position until the solder solidifies, and thereafter, the platen 1 is moved to its horizontal position. The exchanger 4 is then removed from the platen 1, or if there are bends 8 at the opposite end thereof to be soldered to tubes 6 and 7, the exchanger 4 is reversed, end-to-end, and the cycle is repeated.

Preferably, also, the burners 22 are oscillated by means of the drive 28 during the time that the flames thereof impinge on the bends 8 and the ends of the tubes 6 and 7.

It will be apparent that the apparatus of the invention can be controlled manually to cause the various steps described hereinbefore to be performed. However, it is preferred that the cycle of operation be carried out automatically once the cycle has been initiated manually.

Figure 7:
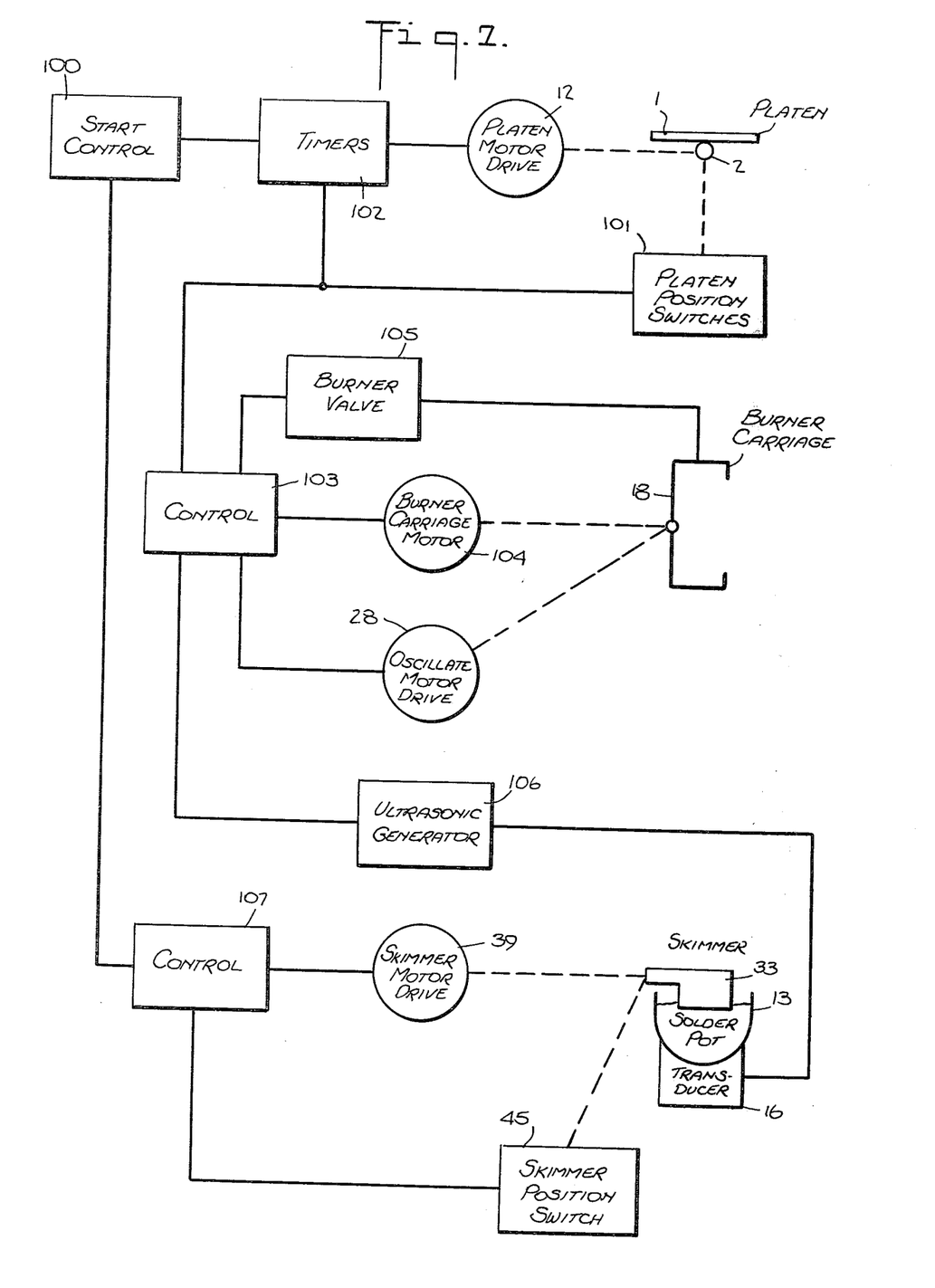
FIG. 7 is a block diagram of an automatic control system for sequential operation of the various parts of the apparatus shown in FIG. 1.
Figure 8:
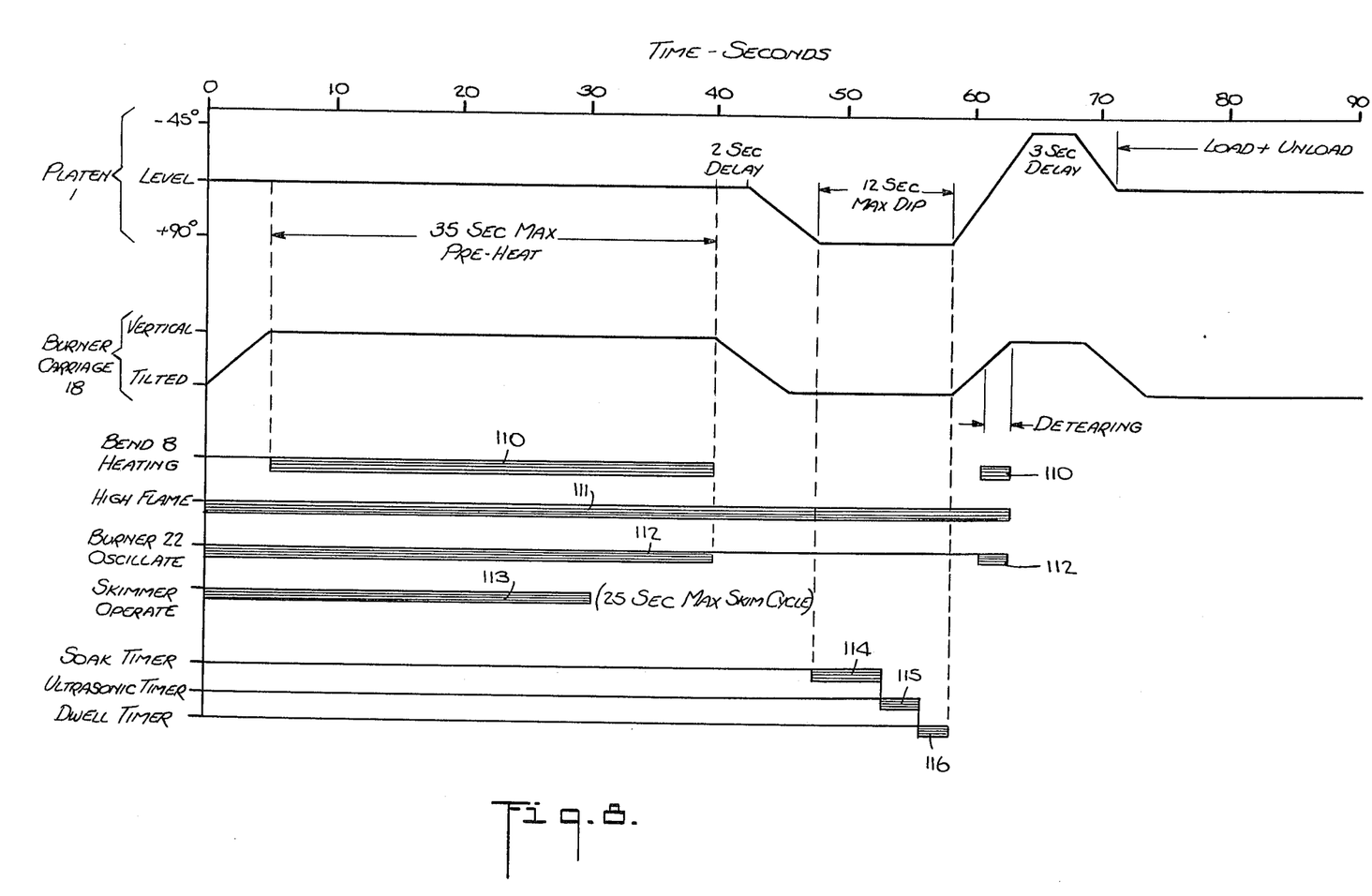
FIG. 8 is a timing diagram used to explain the operation of the apparatus shown in FIGS. 1 and 7.

FIG. 7 is a simplified block diagram of an automatic control system for causing the soldering apparatus previously described to operate as described. FIG. 8 is a timing diagram which should be considered in connection with FIG. 7 and illustrates representative operating, it being understood that the times may be varied as required. In FIG. 8, the uppermost graph represents the position of the platen 1 at various times and the next lower graph represents the position of the burner carriage 18 at various times. The remaining graphs represent by the shaded areas the times when certain operations take place. For example, the shaded area 110 indicates the time period during which the return bends 8 are subjected to the flames from the burners 22, and the shaded area 111 indicates the period of time during which the flames from the burners 22 are at a high level. Shaded areas 112 and 113 respectively indicate the periods of time when the burner carriage 18 is oscillated and the motor drive 39 which drives the paddle 33 is operating. The shaded areas 114, 115 and 116 indicate the time periods of timers which respectively determine the time that the bends 8 are immersed in the molten solder 14 before the transducers 16 are activated, the time that the transducers 16 are activated and the time that the bends 8 remain in the molten solder 14 after the transducers 16 are de-activated.

During the time that the heat exchanger 4 is being loaded on and unloaded from the platen 1, the platen 1 is in its level position, i.e. its upper surface is horizontal (see right end of upper line, FIG. 7), and when the exchanger 4 has been loaded onto the platen 1, the operator manually operates the start control 100. The support shaft 2 for the platen 1 controls conventional cam operable switches 101 so that the various switches are opened or closed dependent upon the position of the platen 1. The switches 101 are connected to the timers 102 and the control 103, the latter including timers and relays, as required, to operate the burner carriage motor 104 of the drive 22, a burner valve 105, the burner carriage oscillating motor drive 28 and the ultrasonic energy generator 106, connected to the transducers 16, in the manner hereinafter described.

The burner carriage 18 is in its tilted or rest position, and operation of the start control 100, initiates operation of one of the timers 102, and through control 103, movement of the burner carriage 18 toward its vertical position, operation of the oscillate motor drive 28 and opening of the burner valve 105 so that the flame size at the burners 22 increases. Operation of the start control 100 also initiates, through a control 107, the operation of the skimmer motor 39 which moves the paddle or skimmer 33 which completes its cycle in about 20-25 seconds (see FIG. 7).

The burner carriage 18 remains in its vertical position about 35 seconds (see FIG. 7) and then, the control 103 energizes the burner carriage motor 104 which moves the carriage 18 to its tilted position where it remains until the dip portion of the platen cycle is completed. Thereafter, the motor 104 moves the carriage 18 into its vertical position for about five seconds and then, returns to its tilted position. In the meantime, about 42 seconds after the start control 100 has been operated, the platen 1 moves from its level position to its plus 90° position in which the tubes 8 to be soldered to the tubes 6 and 7 are immersed in the molten solder 14 in the pot 13 where the platen 1 remains for about 12 seconds. After the platen has been in its plus 90° position for about seven seconds (to permit soaking of the tubes in the molten solder 14), the control 103 turns the ultrasonic generator 106 on for about three seconds and then, turns it off. The platen 1 is maintained in its plus 90° position for about another two seconds, and then, the platen 1 is moved to its minus 45° position where it is held for about three seconds. Finally, the platen 1 is returned to its level position.

As the platen 1 moves from its plus 90° position to its minus 45° position, the tubes with the solder thereon pass through the flames from the burners 22 because of the simultaneous movement of the burner carriage 18 into its vertical position (see FIG. 7). The flames impinge only on the ends of the U-shaped tubes 8 remote from the joints to avoid significant reheating of the solder in the joints and cause any solder on the surface of, or within, the U-shaped tubes to remain molten until the platen 1 reaches its minus 45° position, thereby reducing, or eliminating, tears or icicles, and causing any solder within the U-shaped tubes 8 to run out of such tubes 8 and be dispersed over a relatively wide area.

The burner valve 105 may be operated to reduce the flame size when the burner carriage initially moves from its vertical position and to increase the flame size when the carriage 18 next moves to its vertical position rather than remain open, as indicated in FIG. 7, from the time of start until the carriage 18 moves to its vertical position for the second time.

However, the time taken to lower and raise the flames usually is such that it is better to leave the flames at their high level for the time period indicated in FIG. 7.

FIG. 7 also indicates that the carriage oscillate motor 28 operates only from the time of start until the carriage 18 starts to move from its vertical position and again operates during the time that the carriage 18 moves toward its vertical position for the second time. Such operation is preferred to prevent transmission of vibrations from the carriage 18 to the tubes during the time they are immersed in the molten solder and are being removed therefrom.

At the end of the cycle of operation, that is, when the platen 1 reaches its level position and the burner carriage 18 reaches its tilted position and the exchanger 4 is ready to be unloaded, the cycle of operation of the apparatus is not resumed until the start control 100 is again operated.

While it is preferred that the platen 1 be in its horizontal position while the exchanger 4 is loaded thereon or unloaded therefrom to make such loading and unloading easier, nevertheless, the platen 1 could be in its 45° position during such loading and/or unloading. Also, while a 45° position is preferred, a different angle could be used or if it is found to be practical, movement of the platen 1 could be limited to the horizontal and plus 90° positions, the 45° position being eliminated. Also, if the loading and unloading of the exchanger 4 is accomplished with the platen 1 in a position such that the burners 22 do not interfere with such loading and unloading, the burner carriage 18 may rest in its vertical position shown in solid lines in FIG. 2 thereby eliminating initial movement thereof into its vertical position and final movement thereof into a tilted position.

While the apparatus of the invention is particularly useful for the soldering of return bends to tubes, it will be apparent that the apparatus may be employed for the soldering of other parts. Also, while it is preferred to flare the ends of the tubes 6 and 7 and to insert the ends of the bends 8 therein, the ends of the bends 8 may be flared and the ends of the tubes 6 and 7 may be inserted therein provided that care is taken to retain solder in the spaces between the tubes 6 and 7 and the bends 8.

Preferably, the bends 8 are heated to a temperature above the melting point of the solder 14 while they are intermediate the position in which they are immersed in the solder 14 and the position in which the bends 8 are above the ends of the tubes 6 and 7. However, the bends 8 could be heated after reaching the latter position.

Because pivotal mounting of the burner carriage 18 is simpler, such mounting is preferred. However, if desired, the carriage 18 may be mounted in an obvious manner, such as on slides or rails, so that it moves along a horizontal path toward and away from the bends 8 to perform the preheating and postheating of the bends 8.

Although preferred embodiments of the present invention have been described and illustrated, it will be understood by those skilled in the art that various modifications may be made without departing from the principles of the invention.

What is claimed is:

1. Apparatus for soldering a first part to a second part comprising:
    a support having an upper surface for receiving said first part and said second part with portions thereof in engaged relation and which is mounted for pivotal movement around a horizontal axis, said support being pivotable from a first position in which said surface is generally horizontal to a second position at one side of said axis in which said surface is at an angle to the horizontal;
    a solder pot for containing molten solder, said pot being disposed to surround said engaged portions of said first part and said second part with molten solder when said support is in said second postion;
    heating means for heating said first part and said second part to a temperature above the melting point of solder, said heating means being mounted adjacent said solder pot and said support and being mounted for movement toward and away from said pivotable support into a position adjacent said first part and said second part when the support, and hence the parts, are in a position spaced from said second position, whereby the parts on said support may be pre-heated prior to immersion thereof in the solder in said pot by pivoting said support into said second position thereof and may be heated to a temperature above the melting point of solder after the parts are removed from the solder in the pot by pivoting said support away from said second position and toward said first position; and
    means for pivoting said support and for moving said heating means.

2. Apparatus as set forth in claim 1 wherein said support is also pivotable to a third position at the opposite side of said axis in which said surface is at an angle to the horizontal.

3. Apparatus as set forth in claim 1 further comprising means connected to said pot for agitating molten solder within said pot with ultrasonic energy and means for melting solder in said pot.

4. Apparatus as set forth in claim 1 further comprising means connected to said heating means for oscillating said heating means in a direction substantially parallel to said axis.

5. Apparatus as set forth in claim 1 wherein said heating means is mounted for pivotal movement around an axis spaced from and substantially parallel to said horizontal axis.

6. Apparatus for soldering a first part to a second part comprising:

a support having an upper surface for receiving said first part and said second part with portions thereof in engaged relation and which is mounted for pivotal movement around a horizontal axis, said support being pivotable from a first position in which said surface is generally horizontal to a second position at one side of said axis in which said surface is at an angle to the horizontal;

heating means for heating said first part and said second part to a temperature above the melting point of solder and mounted for movement toward and away from said pivotable support with said first part and said second part mounted on said support;

a solder pot for containing molten solder, said pot being disposed to surround said engaged portions of said first part and said second part with molten solder when said support is in said second position;

means for pivoting said support and for moving said heating means; and skimming means for displacing dross on molten solder in said pot, said skimming means being mounted adjacent said pot and comprising a paddle insertable into and removable from molten solder in said pot, means for moving said paddle in two directions substantially parallel to the surface of molten solder in said pot and means for moving said paddle into the molten solder as said paddle moves in one of said two directions and for removing said paddle from the molten solder as said paddle moves in the other of said two directions.

7. Apparatus for soldering a first part to a second part comprising:

a support having an upper surface for receiving said first part and said second part with portions thereof in engaged relation and which is mounted for pivotal movement around a horizontal axis, said support being pivotable from a first position in which said surface is generally horizontal to a second position at one side of said axis in which said surface is at an angle to the horizontal;

heating means for heating said first part and said second part to a temperature above the melting point of solder and mounted for pivotal movement around an axis spaced from and substantially parallel to said horizontal axis and for movement toward and away from said pivotable support with said first part and said second part mounted on said support;

a solder pot for containing molten solder, said pot being disposed to surround said engaged portions of said first part and said second part with molten solder when said support is in said second position;

first motor driven means connected to said support for pivoting said support;

second motor driven means connected to said heating means for pivoting said heating means; and control means including timing means connected to said first and second motor driven means for sequentially:

(a) moving said heating means adjacent said portions of said first and said second parts and heating them while said support is in said first position;

(b) moving said heating means away from said portions and moving said support from said first position to said second position;

(c) maintaining said support in said second position for a predetermined time;

(d) after the expiration of said predetermined time, moving said support from said second position to a position in which said first and second parts are removed from said solder pot; and (e) moving said heating means adjacent said portions and heating them when said support has been moved from said second position and is in a position in which said parts are removed from said solder pot.

8. Apparatus as set forth in claim 7 wherein said position in which said parts are removed from said solder pot is a third position at the side of the axis of said support at which said second position is disposed and wherein said control means further comprises means for moving said support from said third position to said first position after maintaining said platen in said third position for a time sufficient to permit the solder to at least partially solidify.

9. Apparatus as set forth in claim 8 further comprising skimming means for displacing dross on molten solder in said pot, said skimming means being mounted adjacent said pot and comprising a paddle insertable into and removable from molten solder in said pot, motor means for moving said paddle in two directions substantially parallel to the surface of molten solder in said pot and means for moving said paddle into the molten solder as said paddle moves in one of said two directions and for removing said paddle from the molten solder as said paddle is moved in the other of said two directions and wherein said control means is connected to said last-mentioned motor means for moving said paddle in said one of said directions prior to moving said support into said second position.

* * * * *